(12) United States Patent
Slik

(10) Patent No.: US 6,725,274 B1
(45) Date of Patent: Apr. 20, 2004

(54) FAIL-SAFE SYSTEM FOR DISTRIBUTING STREAMING MEDIA HAVING A DYNAMICALLY RECONFIGURABLE HIERARCHY OF RING OR MESH TOPOLOGIES

(75) Inventor: David Slik, Brackendale (CA)

(73) Assignee: Bycast Inc., Vancouver (CA)

( * ) Notice: Subject to any disclaimer, the term of this patent is extended or adjusted under 35 U.S.C. 154(b) by 0 days.

(21) Appl. No.: 09/537,419

(22) Filed: Mar. 29, 2000

(51) Int. Cl.$^7$ .............................................. G06F 15/16
(52) U.S. Cl. ...................... 709/231; 709/201; 709/238; 725/34; 725/36; 370/232
(58) Field of Search ................................ 709/219, 231, 709/241, 201, 238; 725/36, 34; 370/352, 395.31, 232, 390, 256, 412

(56) References Cited

U.S. PATENT DOCUMENTS

| | | | |
|---|---|---|---|
| 5,093,824 A | | 3/1992 | Coan et al. .................. 370/16 |
| 5,491,801 A | * | 2/1996 | Jain et al. ................... 709/241 |
| 5,590,284 A | | 12/1996 | Crosetto ................ 395/200.05 |
| 5,627,822 A | | 5/1997 | Edmaier et al. ............ 370/218 |
| 5,761,602 A | * | 6/1998 | Wagner et al. ................ 725/34 |
| 5,802,278 A | | 9/1998 | Isfeld et al. ........... 395/200.02 |
| 5,809,286 A | | 9/1998 | McLain, Jr. et al. ........ 395/500 |
| 5,831,975 A | * | 11/1998 | Chen et al. ................. 370/256 |
| 5,841,775 A | | 11/1998 | Huang ........................ 370/422 |
| 5,892,535 A | * | 4/1999 | Allen et al. .................... 725/36 |
| 5,920,410 A | | 7/1999 | Smith et al. ................ 359/119 |
| 5,936,940 A | * | 8/1999 | Marin et al. ................ 370/232 |
| 5,983,005 A | * | 11/1999 | Monteiro et al. ........... 709/231 |
| 6,006,259 A | | 12/1999 | Adelman et al. ........... 709/223 |
| 6,148,410 A | * | 11/2000 | Baskey et al. ................. 714/4 |
| 6,233,245 B1 | * | 5/2001 | Chapman et al. ........... 370/412 |
| 6,349,329 B1 | * | 2/2002 | Mackintosh et al. ........ 709/219 |
| 6,356,553 B1 | * | 3/2002 | Nagami et al. ............. 370/397 |
| 6,408,000 B1 | * | 6/2002 | Lamberg et al. ............ 370/390 |
| 6,411,616 B1 | * | 6/2002 | Donahue et al. ............ 370/352 |
| 6,577,634 B1 | * | 6/2003 | Tsukakoshi et al. ... 370/395.31 |

FOREIGN PATENT DOCUMENTS

GB        2336079        6/1999

* cited by examiner

*Primary Examiner*—David Wiley
*Assistant Examiner*—Phouc H. Nguyen
(74) *Attorney, Agent, or Firm*—Roylance, Abrams, Berdo & Goodman, LLP

(57) ABSTRACT

A distribution network architecture resistant to component failure is provided for distributing streaming media which supports partial mesh and ring-based topologies. Data streams are provided to and transmitted from distribution router clusters employing a shared broadcast medium having one-to-many relationship between respective input distribution routers and output distribution routers. The shared broadcast medium can be a plurality of hubs configured to transmit packets and signaling on opposite, unidirectional paths.

10 Claims, 5 Drawing Sheets

FAIL-SAFE SYSTEM FOR DISTRIBUTING STREAMING MEDIA HAVING A DYNAMICALLY RECONFIGURABLE HIERARCHY OF RING OR MESH TOPOLOGIES

CROSS REFERENCE TO RELATED APPLICATIONS

Related subject matter is disclosed in U.S. patent application of David Slik, Ser. No. 09/493,087, filed on Jan. 28, 2000 and entitled "Content Distribution System for Generating Content Streams to Suit Different Users and Facilitating E-Commerce Transactions Using Broadcast Content Metadata", the entire contents of said application being expressly incorporated herein by reference.

FIELD OF THE INVENTION

The invention relates generally to a streaming media distribution architecture that is reliable and resistant to component failures.

BACKGROUND OF THE INVENTION

A number of systems for distributing data such as streaming media have been proposed which are implemented using a bus between system components. For example, U.S. Pat. No. 5,802,278 describes a bridge/router architecture that is scalable. Input and output modules providing network interfaces are interconnected via a backbone for signaling. These systems are disadvantageous because the bus presents a single point of failure. In other words, the system is rendered inoperable upon bus failure. A need exists for a distribution architecture that is flexible and reconfigurable and is not required to have a shared backbone communication medium to communicate data payloads and messages relating to routing and other functions.

Other distribution systems have been proposed which provide multiple paths between a plurality of components, that is, a cluster. A fail-over cluster is described in U.S. Pat. No. 6,006,259 which performs adaptive load balancing of its components to optimize message throughput. TCP/IP requests therein are processed as if the cluster is a single device without having to have detailed knowledge of the internal cluster topology. If component failure occurs, another component is used in its place. The topology of the cluster, however, is unchanged. The cluster is not optimal in terms of providing alternate paths for data when component failures occur upstream of the cluster, for example. A need exists for a fail-safe system that provides for topology reconfiguration and therefore more than mere load balancing operations within a cluster.

Communication protocols are provided in a conventional content distribution system to permit topology configuration or re-routing around failed components in a cluster. These communications between components can result in delays and packet loss, among other issues, which in turn result in disruptions to real-time data flows. A need therefore exists for a distribution system that provides end-to-end passive fault tolerance and recovery to permit the reliable distribution of real-time data streams in the presence of component failures.

SUMMARY OF THE INVENTION

A distribution network architecture for distributing data (e.g., streaming media) is provided which is resistant to component failure. The architecture employs a dynamically reconfigurable hierarchy of ring and mesh topologies.

In accordance with another aspect of the present invention, a distribution router cluster is provided comprising multiple input distribution routers that broadcast or multicast packets to multiple output distribution routers via a shared medium. Multiple equivalent streams are provided to respective input distribution routers that enqueue packets in variable length queues. Once dequeued and broadcast, the packets are enqueued at selected ones of the output distribution routers if they contain a selected stream-unique identifier and the sequence number of the packet has not already existed in the output queue. Output distribution routers receive duplicate or equivalent packets for each media stream and can discard all but one of each packet.

In accordance with another aspect of the present invention, the architecture comprises distribution router clusters with ring connections at regional and local hierarchical levels, respectively.

In accordance with yet another aspect of the present invention, the architecture is passive and does not require a communication protocol for routing around failed system components. Packet streams need not by synchronized. In addition, packets are not internally routed along selected paths using switching functions.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
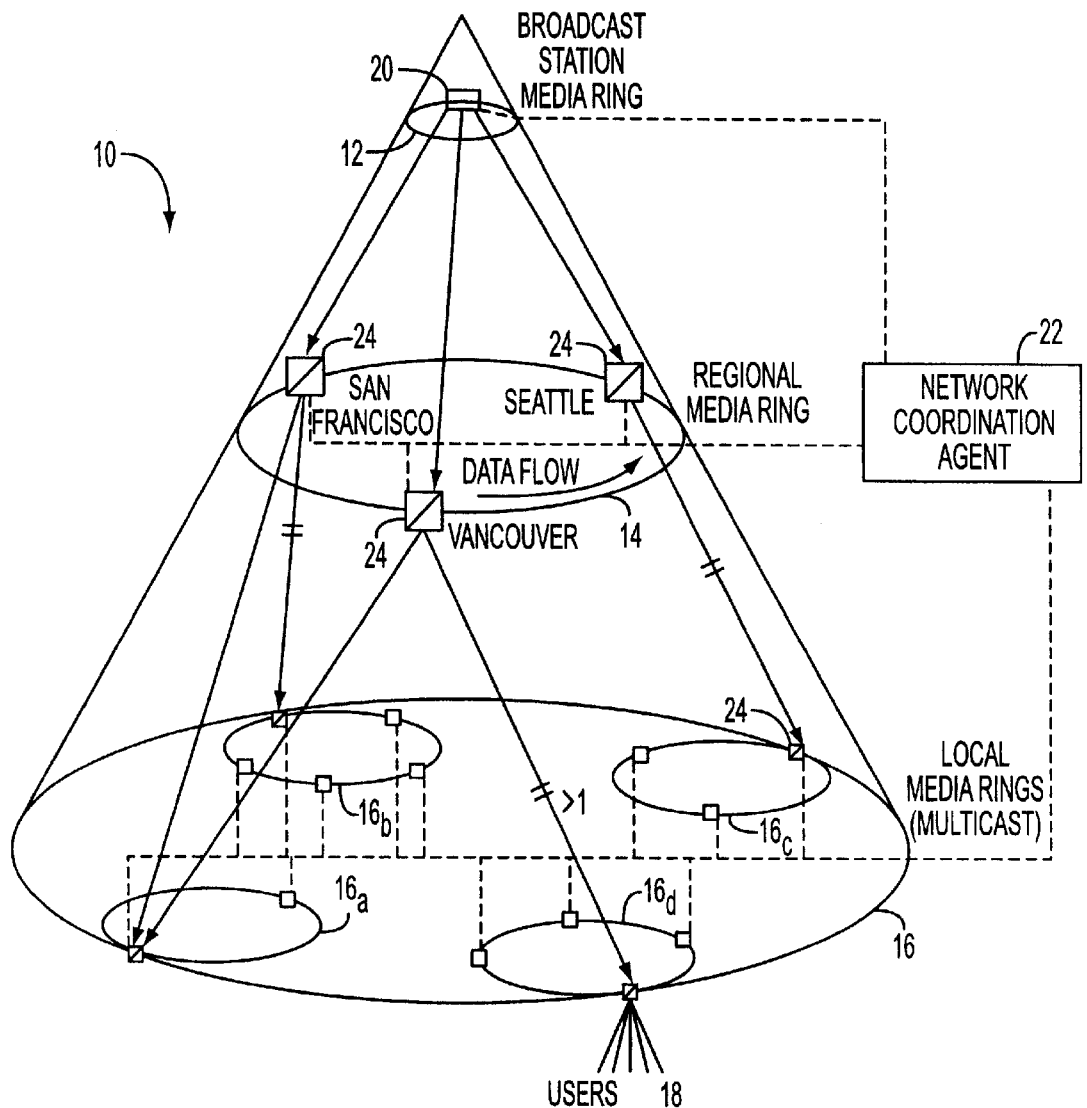
FIG. 1 illustrates a distribution network architecture constructed in accordance with an embodiment of the present invention.

FIG. 1 depicts a distribution network architecture 10 constructed in accordance with an embodiment of the present invention. The distribution network architecture 10 preferably supports partial mesh and ring-based topologies. For illustrative purposes, three rings 12, 14 and 16 are shown; however, it is to be understood that other hierarchies having different numbers of horizontal layers can be implemented using the distribution network architecture 10 of the present invention.

With continued reference to FIG. 1, a broadcast station media ring 12 is provided to transmit plural and equivalent data streams to different devices connected via a regional media ring 14. As will be described below in connection with FIG. 2, equivalent input streams from different sources comprising, for example, serialized media can traverse a network by different routes for reception at different components (i.e., routers in the regional media ring 14). Thus, a streaming media distribution system implemented using the architecture 10 of the present invention is safeguarded against component failures such as the inability of a broadcast station transmitter 20 in the broadcast station media ring 12 to transmit a media stream. The media streams are distributed to users 18 in a number of local media rings indicated generally at 16 in FIG. 1. At the lowest level architecture 10, a partial mesh is used to create a branched ring suitable for N point delivery to users 18.

Figure 3:
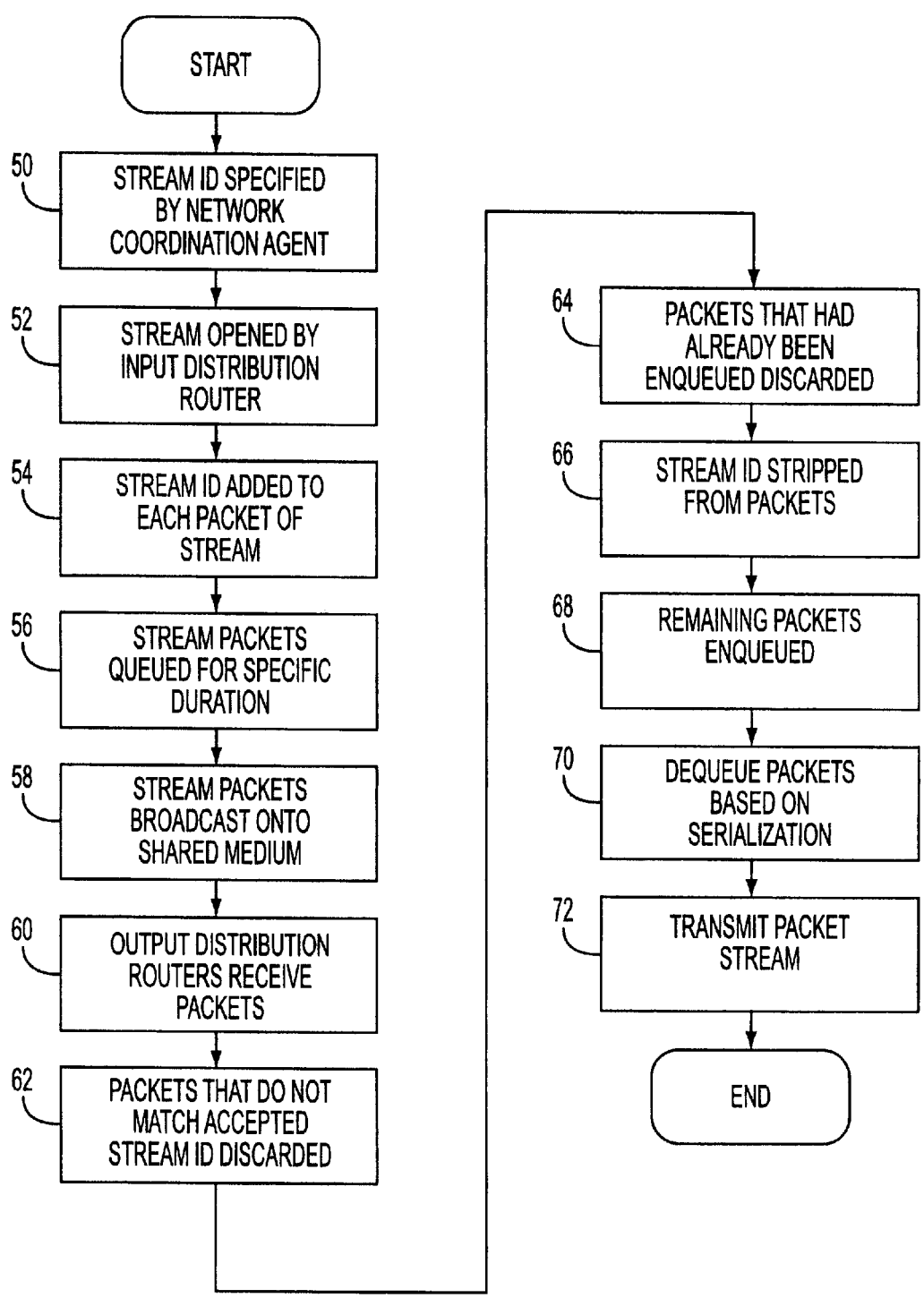
FIG. 3 is a flowchart illustrating a sequence of operations for processing packets in a distribution router cluster in accordance with an embodiment of the present invention.

In the illustrated embodiment, broadcast stations indicated generally at 20 transmit media streams that are preferably selected and requested by a network coordination agent 22, as indicated in blocks 50 and 52 of FIG. 3. The network coordination agent can be implemented, for example, in a market server as disclosed in the above-referenced, commonly assigned patent application Ser. No. 09/493,087. Alternatively, the network coordination agent activities can be completely passive, responding only to downstream requests. The broadcast station media ring 12 permits selected media streams to be transmitted by redundant broadcast station transmitters. The broadcast media streams are received at distribution network clusters 24 provided in the regional media ring 14. In the illustrated embodiment, the clusters 24 can be located in different geographic areas such as in different cities or metropolitan areas.

Figure 2:
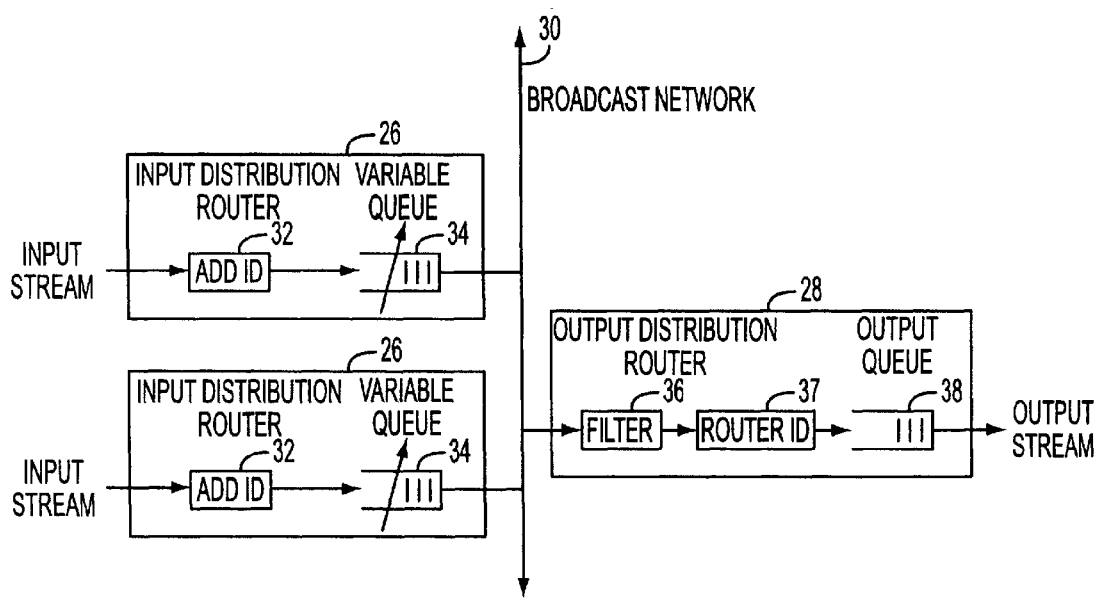
FIG. 2 is a block diagram of a distribution router cluster constructed in accordance with an embodiment of the present invention.

With continued reference to FIG. 2, an exemplary distribution router cluster 24 is illustrated in accordance with an embodiment of the present invention. Each cluster 24 preferably comprises a plurality of input distribution routers 26 which are connected to an output distribution router 28 by a broadcast network 30. To provide stream transport through a cluster 24, N streams of equivalent, serialized media are preferably opened by the network coordination agent 22 and provided to each of the input distribution routers 26. Equivalent serialized media are identical packets that each contain a sequence number (usually assigned sequentially). If two packets have the same sequence number, then their contents are regarded as equivalent. The Network Coordinating Agent is the software entity that is responsible for stream initiation which is typically the result of a request from a downstream system or client. Streams can also be initiated by other network devices. It is to be understood that a cluster 24 can have any number of input distribution routers 26. Each input stream is preferably from a different source in a streaming media distribution system and traverses a network by a different route than other input streams. When establishing connections, the network coordinating agent 22 is programmed to maximize physical route diversity to and from the clusters 24 while mining transmission delay variances.

As shown in FIG. 2, each input distribution router 26 receives packets in an input stream. If the packets do not include a stream identification code, the input distribution router 26 provides a unique code (e.g., content block id) for each stream to the packet, as indicated at 32 in FIG. 2 and in block 54 in FIG. 3. The packet is then written to a queue 34 which is variable in length to correspond to a system parameter relating to transmission delay which can be controlled by the network coordination agent 22 (block 56) or initial state tables based on the delta between different equivalent incoming streams. Packets can then be read from the queue 34 and broadcast onto the shared medium 30 (block 58). If a collision is detected, the input distribution router 26 is programmable to retransmit the packet after a selected back off delay period.

The output distribution router 28 filters all incoming packets, as indicated at 36 in FIG. 2 and in block 60 of FIG. 3, based on which streams have been requested by downstream clients. With continued reference to FIG. 3, each output distribution router 28 receives N duplicate or equivalent packets for each data stream and discards all packets but one (blocks 62 and 64). The output distribution router also discards packets of received data streams that do not correspond to the stream identification codes. The output distribution router is configured to analyze incoming packets and write packets which satisfy selected conditions to an ordered linked list queue 38 (block 68). The conditions are preferably as follows: (1) a packet is written to the queue 38 if the unique stream identification code contained within the packet matches the stream identification code requested for downstream transmission; or (2) the sequence number of the packet has not already been written to the queue 38. The sequence number is added at the broadcast station or the stream source. It is retained throughout the distribution system and is stripped out at the endpoint or stream sink.

Once packets have been accepted into the queue 38, the stream identification code and/or the sequence number code can be removed prior to downstream transmission (block 66). Based on the serialization of the media stream, a packet can be read from the queue 38 every selected number of milliseconds, for example, and transmitted as the output stream (blocks 70 and 72). Accordingly, the packet is removed from the ordered linked list queue 38.

As stated previously, each output distribution router 28 receives N duplicate or equivalent packets for each data stream and discards all packets but one. The output distribution router also discards packets of received data streams that do not correspond to the stream identification code selected for that output distribution router by the downstream clients. Thus, if an input distribution router 26 fails, one less duplicate packet is present on the network, and the loss of such packet has no impact on the output stream. If an input stream becomes desynchronized, other packets are selected first, thereby resulting in no impact on the output stream. If an output distribution router 28 fails, the corresponding output stream also fails. Compensation for this type of component failure is provided at the lower level of the distribution architecture 10 since output streams are generated by other output distribution routers. If the output distribution router is at the lowest level of the architecture 10, then the users 18 are momentarily disconnected until an alternate router 28 is brought online or an alternate router is used.

Figure 4:
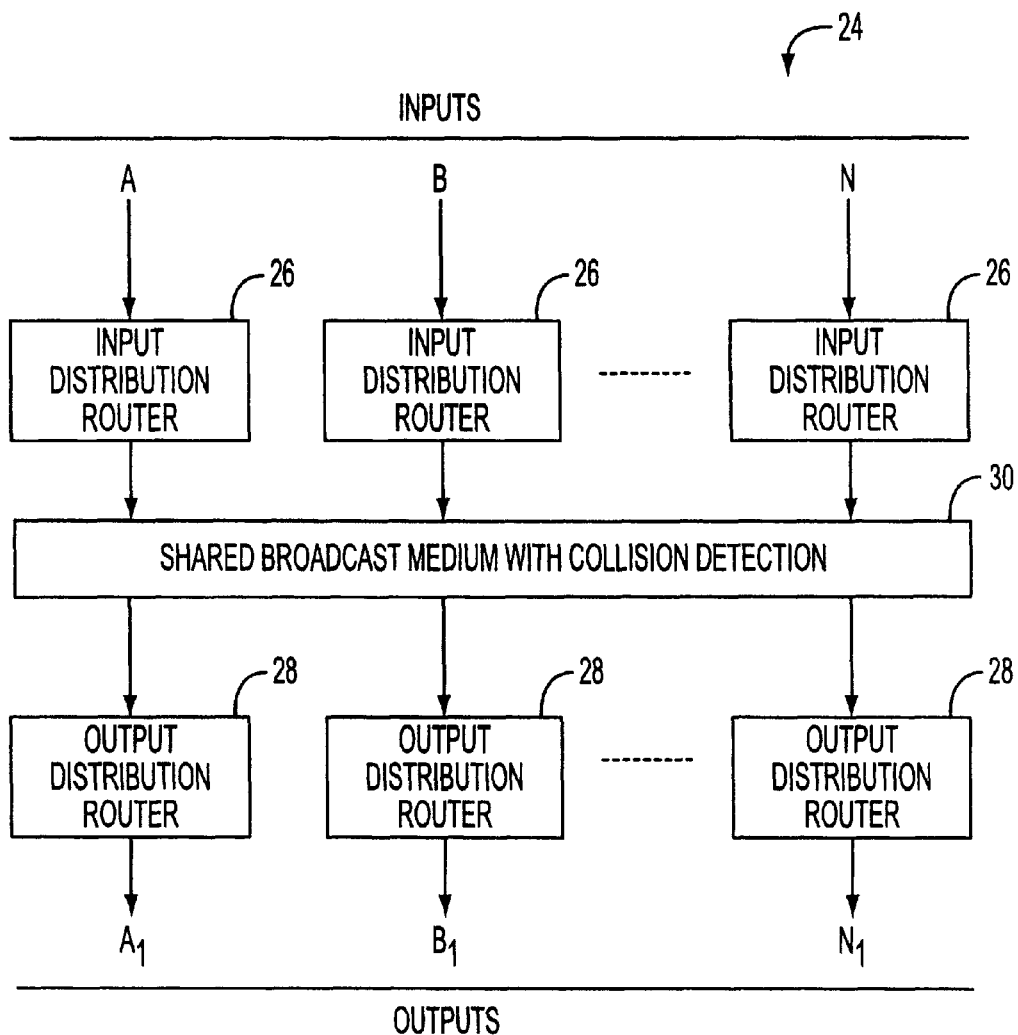
FIG. 4 is a block diagram of a distribution router cluster constructed in accordance with an embodiment of the present invention.

FIG. 4 provides another illustrated embodiment of a distribution router cluster 24. The distribution cluster 24 comprises a number of input distribution routers 26 and a number of output distribution routers 28 which are connected by a shared broadcast medium 30 which preferably provides collision detection. Unsynchronized streams A, B and C of unordered packets of serialized media are provided to the input distribution routers 26. Synchronized streams $A_1$, $B_1$, and $C_1$ of ordered packets of serialized media are output from the respective distribution routers 28.

Figure 5:
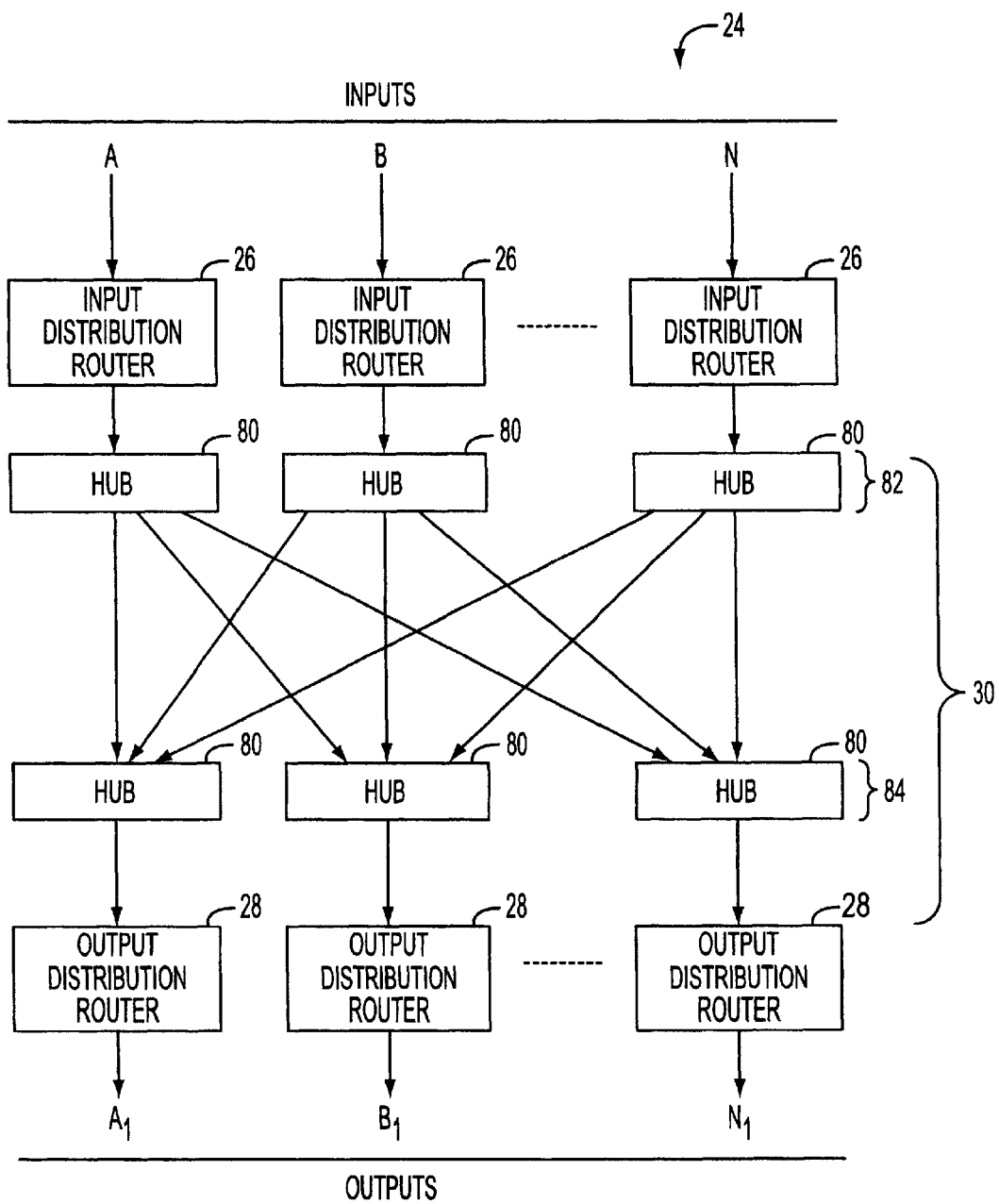
FIG. 5 is a block diagram of a distribution router cluster constructed in accordance with an embodiment of the present invention.

With reference to FIG. 5, an exemplary implementation of the shared broadcast medium 30 of the distribution router cluster 24 can be a series of hubs 80 connected in a one-to-many configuration which allows packets to be broadcast downstream, while preventing the failure of any specific hub 80 from resulting in the failure of the distribution router cluster 24. The hubs 80 are configured such that communication links between the first level of hubs 82 and the second level of hubs indicated at 84 allows packets and collision detection signaling to traverse the links by opposing and unidirectional paths. The distribution routers 26 and 28 in the hubs 80 support many different streams simultaneously and with varying levels of redundancy. For example, a 4×6 cluster can host ten 4×4 streams and two 2×3 streams and a 4×6 stream simultaneously. Stream inputs and outputs can be dynamically added and removed, for example, by the network coordination agent 22 and downstream requests.

With further reference to FIG. 1, the distribution architecture 10 provides for the delivery of streamed time-based media using the topologies of a dynamically reconfigurable hierarchy of ring or mesh topology. These architectures are enabled by the distribution router cluster 24. As stated previously, the distribution router cluster 24 is an N×M routing system that excepts N inputs of a stream and sends M outputs of the stream. The distribution router cluster 24 is designed such that any system component can fail without impact on the overall distribution system, as long as one of each component of the distribution router cluster 24 remains operational (i.e., a input distribution router 26, an output distribution router 28 and at least part of the broadcast medium 30 such as one hub 80 in each of the levels 82 and 84).

The network coordination agent 22 is preferably implemented using software on the market server which monitors link status, forms network connection setup and brings up or down those links depending on network parameters. The network coordination agent's primary role is tO establish connections at the top of the topology (e.g., from the broadcast station to the top level ring). The broadcast station transmitters 20 accomplish reliable operation by preferably employing multiple synchronized encoders, redundant power supplies and multiple independent internet links. A local distribution router in the local media ring 16 preferably accomplishes reliable operation by employing multiple input distribution routers 26 with ring connection to and from other local distribution clusters 24.

For failure analysis purposes, the upstream output distribution router, that is, a router 28 in the regional media ring 14, the downstream link (e.g., link 86 in FIG. 1) and a downstream input distribution router such as that of the cluster 24 in local media ring 16c can be considered a single node. Thus, failure of any of these elements is equivalent, and multiple failures within the unit has no additional affects. The failure modes for the architecture 10 are discussed in the Table below.

TABLE

| Fault | Failure Modes End Effect | Avoidance |
|---|---|---|
| Single Transmitter/Regional Distribution Cluster Node Failure | None | Fault Alarm on Transmitter, Faulty module hot swapped |
| Dual Transmitter/Regional Distribution Cluster Node Failures | Increased probability of Local Distribution Clusters loosing access to station content | Avoided at single fault level |
| Complete Transmitter/Regional Distribution Cluster Node Failures | All users loose access to station content | Avoided at single fault level |
| Single Regional Distribution Cluster/Local Distribution Cluster Node Failure | None | Alternate route between Regional Distribution Cluster and Local Distribution Cluster established, approx. 1 second establishment time |
| Two Simultaneous shared Regional Distribution Cluster/Local Distribution Cluster Node Failures | One to Two second interruption as alternate routes are established | Avoided at single fault level |
| Local Output Distribution Router Failure | One to Two second interruption as alternate router is brought online | None |

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A system for distributing data streams comprising:

a plurality of input distribution routers;

a plurality of output distribution routers; and a broadcast network connecting the outputs of each of said input distribution routers to the inputs of said output distribution routers, said plurality of input distribution routers being configured to receive multiple equivalent data streams, said broadcast network being operable to provide duplicate said data streams from respective said input distribution routers to each said output distribution routers, said output distribution routers being operable to selectively queue packets from duplicate said data streams, to discard duplicate said packets, and to generate an output signal;

wherein said input distribution routers are configured to store packets in said equivalent data streams in respective variable length queues, the length of said data queues being selected to accommodate a delay associated with providing a plurality of transmission paths for said equivalent data streams.

2. A system as claimed in claim 1, wherein said equivalent data streams are provided by different sources.

3. A system as claimed in claim 1, wherein said packets output from said input distribution routers need not be synchronized and said output distribution routers being operable to synchronize said packets in said output signal.

4. A system as claimed in claim 1, wherein said input distribution routers are operable to provide packets received in corresponding said equivalent data streams with a stream identification code, said output distribution routers being operable to generate said output signal from said packets in said duplicate data streams having a selected said stream identification code.

5. A system as claimed in claim 1, wherein said input distribution routers are operable to retransmit packets in their corresponding said equivalent data stream when a collision occurs in said broadcast network.

6. A method of distributing data streams comprising the steps of:

opening a data stream from a plurality of sources therefor;

transmitting said data stream as broadcast data streams to a plurality of input devices;

identifying each of said broadcast data streams with a stream identification code;

storing packets in said data stream received at each of said plurality of input devices in a first queue;

reading from each said first queue to generate an output data stream;

transmitting each said output data stream to a plurality of output devices;

analyzing each said output data stream received at respective said output devices;

storing said packets in the received said output data stream into a second queue when the corresponding said stream identification code matches a selected stream identification code; and discarding said packets corresponding to each said output data stream received at said output devices that is determined to be duplicative with respect said packets in said second queue.

7. A method as claimed in claim 6, further comprising the step of generating a second output data stream using at least one of said plurality of output devices.

8. A method as claimed in claim 7, wherein said packets in said output data stream need not be synchronized and said generating step comprises the step of synchronizing said packets in said second output data stream.

9. A method as claimed in claim 6, further comprising the steps of transmitting said second output data stream to at least one device in a ring-based network.

10. A method as claimed in claim 6, further comprising the steps of transmitting said second output data stream to at least one device in a ring-based network and to plural devices via a broadcast.

* * * * *